United States Patent

[11] 3,563,498

| [72] | Inventor | James E. Haile<br>Hendersonville, N.C. |
|---|---|---|
| [21] | Appl. No. | 778,244 |
| [22] | Filed | Nov. 22, 1968 |
| [45] | Patented | Feb. 16, 1971 |
| [73] | Assignee | Stencel Aero Engineering Corporation<br>Asheville, N.C.<br>a corporation of North Carolina |

[54] DEVICE FOR APPLYING A RESTRAINING AND STABILIZING FORCE TO A MOVING OBJECT
3 Claims, 9 Drawing Figs.

[52] U.S. Cl. ............................................. 244/122, 188/1
[51] Int. Cl. ....................................................... B64d 25/00
[50] Field of Search ........................................... 244/122, 151, 110; 188/1B

[56] References Cited
UNITED STATES PATENTS
2,352,036  6/1944  Tauty .......................... 244/151

| 2,502,470 | 4/1950 | Martin | 244/122 |
| 3,103,331 | 9/1963 | Stencel | 244/122 |
| 3,334,847 | 8/1967 | Axenborg | 244/122 |
| 3,387,803 | 6/1968 | Bradfield et al. | 244/122 |

Primary Examiner—Milton Buchler
Assistant Examiner—James E. Pittenger
Attorney—Roylance, Abrams, Kruger, Berdo & Kaul ABSTRACT: A device for applying a restraining and stabilizing force to a first object, such as an ejection seat, as it moves away from a second object, such as an aircraft. The device itself includes an elongated rendable web means connected between the first and second objects and an element secured to one of the objects and projecting at least partially through the web means to progressively rend the web means as the first object moves away from the second object. The rendering of the web means provides a restraining force which opposes movement of the first object away from the second object and also provides a stabilizing effect on the first object.

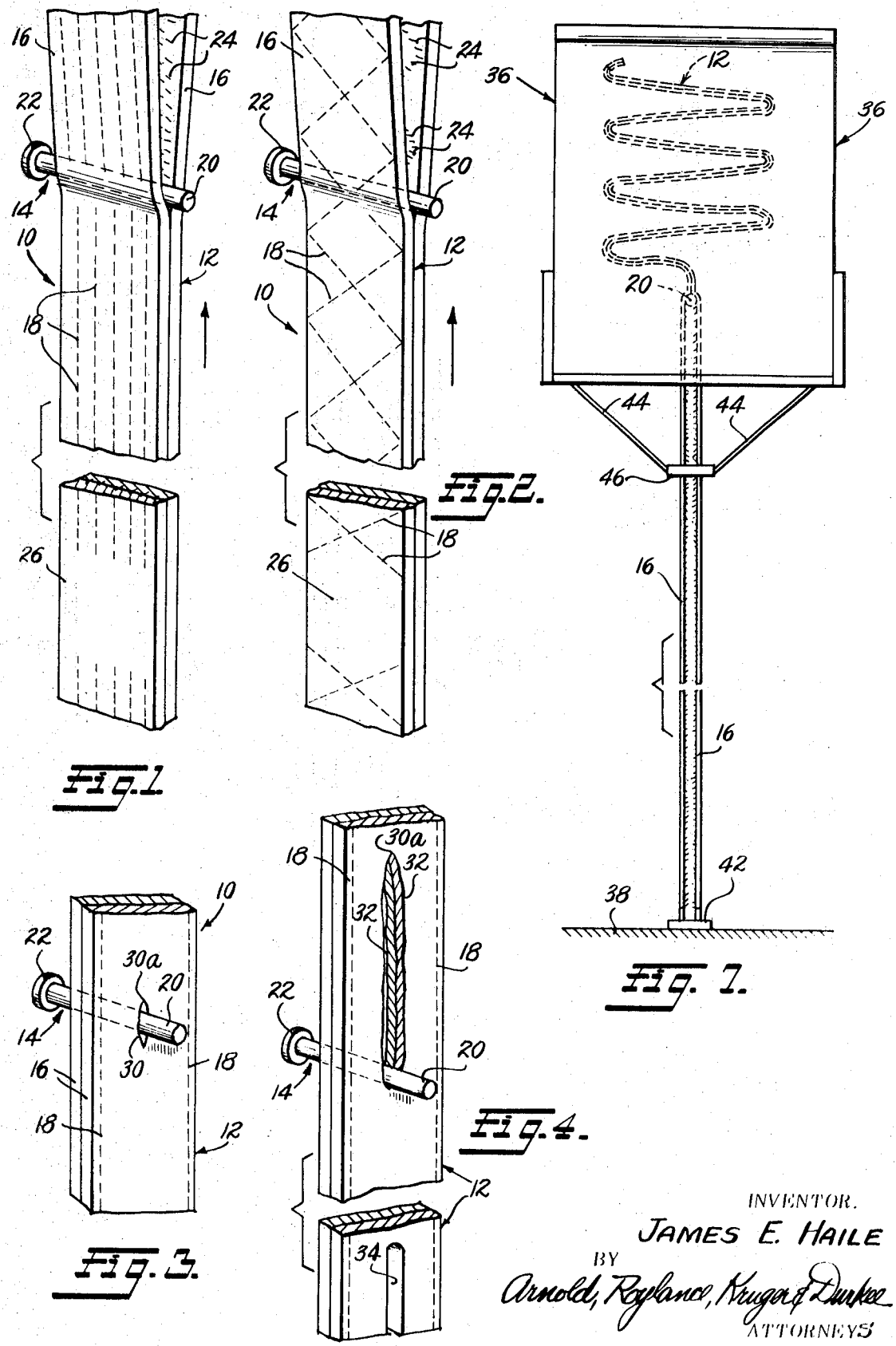

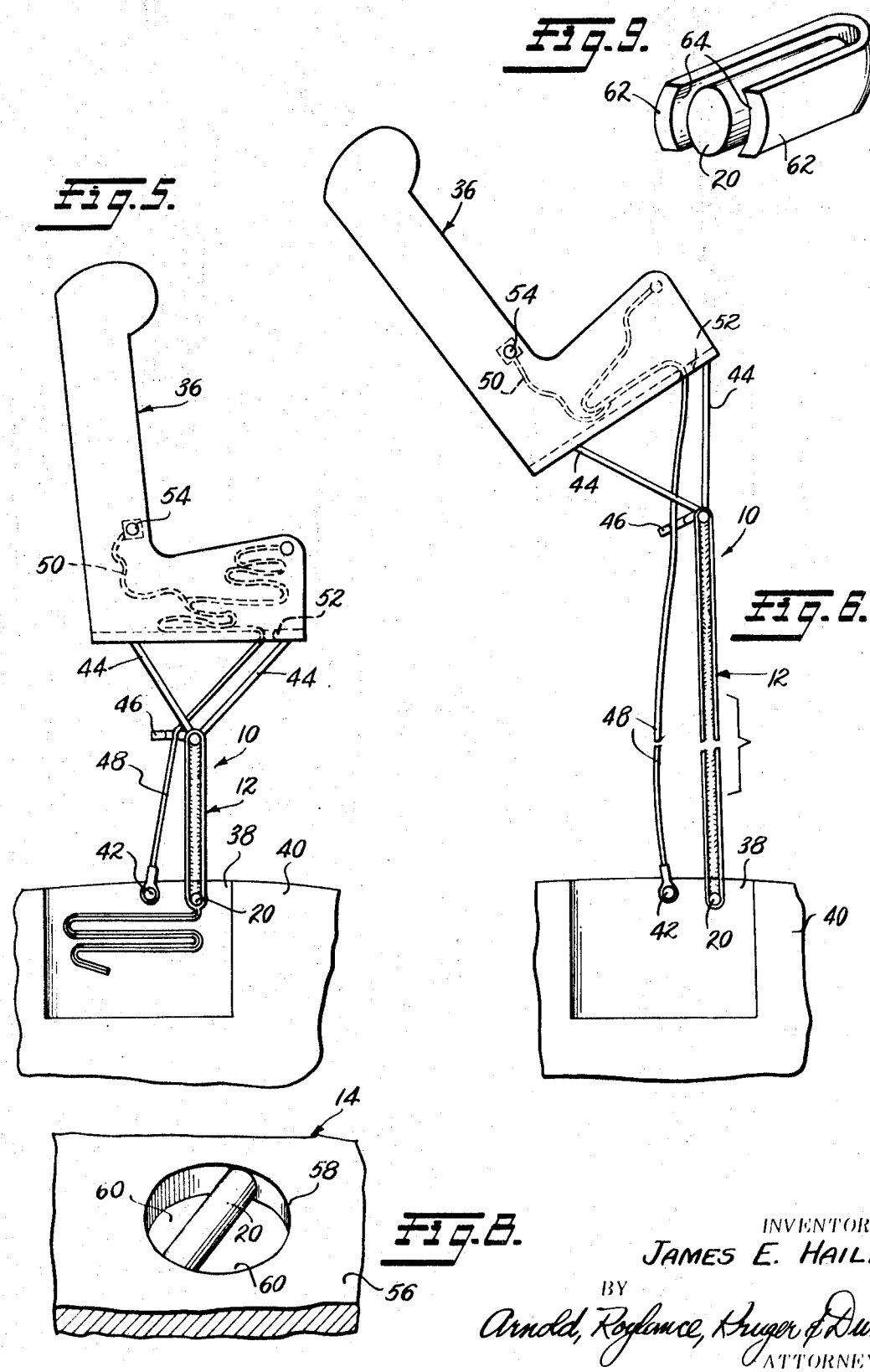

DEVICE FOR APPLYING A RESTRAINING AND STABILIZING FORCE TO A MOVING OBJECT

This invention relates to an improved restraining or braking device which is particularly adapted for use in aerial recovery systems such as those employing an ejection seat for recovering personnel from an aircraft.

The present invention is, in a sense, related to, and adapted for utility in, systems such as those disclosed in U.S. Pat. No. 3,103,331, issued Sept. 10, 1963, to Fred B. Stencel and U.S. Pat. No. 3,387,803, issued Jun. 11, 1968, to Todd S. Bradfield et al. In each of those patents, there is disclosed a system for stabilizing an aircraft ejection seat as it is ejected from an aircraft and for applying a braking or snubbing force thereto. Each of such patents also discloses cooperating roll type brake wheels engageable with a slip line or cable. The present invention provides a different concept of brake means which enables the system to operate without the coaction between brake wheels and a slip line.

In the currently used types of restraining brakes, either those shown in the aforementioned patents or otherwise, the brakes themselves are friction brakes which rely upon frictional force an frictional engagement to create the desired restraining force. These friction brakes have to be carefully calibrated and torqued in order to operate properly, and if an error is made in calibration or in torquing, the braking force may not be the same as is desired. Aside from this factor, there are other factors to be considered in connection with friction brakes such as the fact that such brakes often add extra unnecessary moving parts to the aircraft, which parts must be carefully manufactured, installed and serviced. Also, the presence of such friction brakes may add materially to the weight of an aircraft or an aircraft ejection seat, and on either of these pieces of equipment, weight is an extremely important consideration.

With the foregoing in mind, it is, therefore, an object of the present invention to provide a new, simplified and improved device for applying a restraining force to a moving object.

Another object of the present invention is to provide a restraining device for applying the desired restraining force and stabilizing effect to an ejection seat as the same is ejected outwardly from an aircraft.

Another object of the present invention is to provide a new and improved braking device having improved reliability, reduced cost, lighter weight and a simplified manner of manufacture, installation and operation.

Another object of the present invention is to provide a braking device of improved reliability in an aircraft rejection system, thereby eliminating the need for friction-type brakes which must be calibrated and which can be improperly torques.

Another object of the present invention is to provide a new and improved braking device for an ejection seat or the like, wherein one or more separate lines are eliminated, wherein the number of parts in the system are reduced, and wherein the cost of the overall system is substantially reduced.

Other objects, advantages and salient features of the present invention will become apparent from the following detailed description, which, taken in conjunction with the annexed drawings, discloses several embodiments of the present invention.

Referring now to the drawings, which form a part of this original disclosure:

FIG. 1 is a fragmentary perspective view of a device in accordance with the principles of the present invention;

FIG. 2 is a fragmentary perspective view of a modification thereof;

FIGS. 3 and 4 are fragmentary perspective views of another modification therefor;

FIG. 5 is a diagrammatic elevational view of the device installed between an ejection seat and an aircraft;

FIG. 6 is a view similar to FIG. 5 with the ejection seat being propelled a sufficient distance away from the aircraft to cause a stabilizing effect through the device of the present invention;

FIG. 7 is a diagrammatic elevational view illustrating another manner in which the device of the present invention can be installed in an ejection seat; and FIGS. 8 and 9 are perspective views of suitable elements which can be used in the device of the present invention.

In general, the device of the present invention which is generally designated 10 includes an elongated web means generally designated 12 having one end attached to a first object and having a stationary fixed bar generally designated 14 projecting through the web means attached to a second object, with the other end of the web means free. In operation, the first object, such as an ejection seat, moves away from a second object, such as an aircraft, and in doing so, tends to pull the elongated web means taut by means of the element generally designated 14 which is secured to one of the objects and which projects at least partially through the web means. The element 14 is operative, as the first object moves away from the second object, to progressively rend the web means 12. As used herein, the term "rend" is intended to comprehend ripping, tearing, breaking or other forms of parting of the web means 12.

The web means 12 is formed of a plurality of juxtaposed fabric webs 16 which can be formed of any suitable fabric material or of a resinous material such as nylon or the like. Other suitable materials from which the webs can be fabricated include polyesters and polypropylene. In the embodiments shown in FIGS. 1 and 2, only two web means 16 are provided although it will, of course, be understood that the number of web means is not intended to be a limiting factor in the present invention. The web means 12 also includes stitching means 18 which can be formed of the same material as the webs 16 or which can be formed of some other suitable type of material. If desired, one could even use fine wire or steel cable for the stitching means 18 and staples or rivets could also be used. In FIG. 1, the stitches forming the stitching means are arranged in a plurality of parallel rows extending in the longitudinal direction which is also the direction of elongation of the web means 12. The element 14 is formed as an elongated and generally rigid rod or bar 20 having one end 22 attached to one of the objects, as will be explained in detail hereinafter. As shown in FIG. 1, the bar 20 extends between the two juxtaposed webs 16.

It will be remembered that the web means is initially in at least a partially slack condition when the first object is near the second object, but as the first object starts to move away from the second object, the web means 12 becomes progressively more taut. The direction of applied force and movement is shown by the arrow in FIG. 1 and as such movement occurs, the web means is drawn across, or moved with respect to, the element 14 and the fixed bar or rod 20 thereof. This movement causes the stitches in the stitching means 18 to break as the force draws the web means across the bar 20. These broken stitches are shown above the rod 20 in FIG. 1 and are identified by reference numeral 24. It will be understood that the stitches themselves provide a certain resistance to breaking which, in effect, acts as a braking force. This can be better understood by recognizing that if the bar 20 were eliminated, there would be no force whatsoever acting upon the web means 12 and the same would simply move from a slack to a taut condition without exerting any restraining force on the moving object. However, by interposing the bar 20, there is a progressive breaking of the stitches 18 as the web means 12 moves from its slack to its taut condition and this breaking creates a force which acts as a restraining or braking force on the moving object.

A restraining force applied by the device 10 can be varied both as to time and as to quantity. A time variation can be effected, for instance, by providing a certain area along the web means 12 wherein the stitching means 18 is eliminated. This area, designated 26 in FIG. 1, provides, in effect, a dwell time wherein the bar 20 does not break any stitches and hence does not provide any restraining force. By properly selecting the length of the area 26, as well as the location thereof, or by providing more than one area 26, it is quite possible to provide selected incremental timed braking periods during which the device 10 provides its restraining force. By selectively altering the braking strength of the threads or by changing the number of rows of stitching means 18, or by changing the distance between stitches, it is possible to vary the braking or restraining force which is applied to the moving object by the device 10.

The device 10 as shown in FIG. 2 is quite analogous to the device of FIG. 1, except that the stitching means 18 extend diagonally across the web means 12, rather than extending longitudinally thereof in parallel rows, as was the case with FIG. 1. The same force and time variations can be obtained with the arrangement of FIG. 2, as was possible in the case of FIG. 1.

A somewhat modified form of arrangement is shown in FIGS. 3 and 4 wherein the stitching means 18 along the webs extends only along the side margins or peripheral edges thereof. Centrally of the web means 12, an aperture 30 is formed and the bar or rod 20 of the element 14 extends therethrough. As the web moves in the direction of the arrow shown in FIG. 4, there is an actual ripping or tearing of the web means, thus causing an elongation of the aperture 30. To illustrate this, the top edge or portion of the aperture 30 is designated 30a in FIG. 3 and in FIG. 4. In FIG. 4, the movement of the web means 12 has caused the upper end 30a to be moved considerably away from the bar or rod 20, and this movement has resulted in a tearing elongation or progressive rending of the web means, with the torn edges being identified by the reference numeral 32. The stitching 18 along the edges of the web 16 is intended only to keep the individual webs in alignment while the tearing occurs. It is, however, clear that in the embodiment of FIGS. 3 and 4, there is no actual breaking of the stitches 18, as was the case in the embodiment of FIGS. 1 and 2. It is, however, possible with the embodiment of FIGS. 3 and 4 to get the same type of time variation and quantity of force variation as was possible in the embodiment of FIGS. 1 and 2. The time variation can be accomplished, for example, by providing a slit 34 at a desired location along the web means 12 in alignment with the bar or rod 20. Thus, as the bar or rod passes along the length of this slit 34, there is no force or tension applied. It would also be possible to obtain a time variation by progressively varying the weight or type of web material in the direction of the arrow. For example, a preselected interval of the web means could be formed of a very light weight material through which the rod 20 could tear very easily, without exerting too much force. The next adjacent portion of the web material could be formed of a heavier material which would cause the rod to exert a greater force as it tears therethrough. Finally, another portion could be formed of still heavier material, in which event the rod would exert great force as it passes therethrough. Insofar as force or quantity of force variation is concerned, this can be accomplished quite simply in the embodiment of FIGS. 3 and 4 merely by varying the number of webs ripped or the ripping strength of the material used in each web. It should be apparent that by providing three webs 16 as opposed to two, a greater force will be required to rip through the webs. Moreover, even the material from which the webs are formed can be preselected insofar as tearing or ripping strength is concerned.

With the understanding of the various forms of restraining devices 10 now in mind, attention can be directed to the embodiment of FIGS. 5 and 6 wherein the device itself is installed in an ejection system. The system includes an ejection seat generally designated 36 which is designed to be ejected from the cockpit 38 of an aircraft 40. The device 10 is interposed between ejection seat 36 and the aircraft 40 with the ends of the web being attached to their respective parts. It will be noted that the rod 20 is attached to and fixed with respect to the aircraft 40 and a slack portion of the web means 12 is provided in the aircraft in the length for the desired braking distance. The ejection seat 36 includes a bridle means 44 with a guide 46, similar to that disclosed in the patents mentioned hereinabove. A snubber line 48 extends between the cockpit 38, through guide 46, through a guide eye 52 and is stored in a partially slack manner beneath the base of the seat, with the end of such line being attached to a point on the seat. A branch 50 of this snubber line is attached to an initiator 54 which can serve any desired function, such as release of the harness or lap belt which retains the occupant in the seat.

As the seat is ejected from the aircraft, the device 10 goes into operation by causing the web means 12 to pass across the fixed rod or bar 20 thus breaking the stitching means 18, if the embodiment of FIGS. 1 and 2 is used, or tearing the individual webs 16 if the embodiment of FIGS. 3 and 4 is used. This provides a braking or decelerating or restraining force on the seat 36 as it traverses away from the aircraft. This force will continue, thereby uncoiling the flat portion within the cockpit and such uncoiling and braking action will occur until, as shown in FIG. 6, the web means length is pulled completely out of the cockpit 38, stabilizing the seat 36. Since the manner of such stabilization, and the details of the bridle 44 and the guide 46, are illustrated in great detail in the two patents aforementioned, particularly Bradfield et al. U.S. Pat. No. 3,387,803, it is not considered necessary to discuss the details thereof herein nor to discuss the manner in which such stabilizing occurs. It is sufficient to state that stabilizing does occur, and when the snubber line branch 50 is pulled taut, it actuates the initiator 54 to release the man-seat lap belt or harness, or to perform whatever other effect is intended for the initiator. When the snubber line 48 pulls taut, it arrests the motion of the seat 36 relative to the cockpit 38.

In the embodiment of FIG. 7, there is illustrated the manner in which the system of the present invention can be readily reversed. That is, in FIG. 7, the slack portion of the web means 12 is housed within the ejection seat 36 and the bar or rod 20 is attached thereto. The opposite end of the web means is restrained by an eye or attaching means 42 to the floor of the cockpit 38 in the aircraft. Thus, as the seat 36 ejects upwardly, the slack supply of web means 12 is pulled across the bar or rod 20, thus creating the desired breaking or restraining force, and the separated webs 16 then pass through the guide means 46 of the bridle 44. A variation of this embodiment would place the restraining bar or rod 20 in the guide means 46 of the bridle 44.

In FIGS. 8 and 9, some modified forms of the element 14 are illustrated. In FIG. 8, a flat plate 56 is provided with an aperture 58 which is diametrally spanned by the bar or rod 20. This forms two generally semicircular passages 60 on opposite sides of the bar 20 through which the webs can feed. In FIG. 9, a pair of arcuate arms 62 are disposed on opposite sides of the bar or rod 20 thereby creating a pair of opposed arcuate channels 64 through which the webs can feed. If desired, the width of the channels 60 in FIG. 8 or the channels 64 in FIG. 9 can be somewhat less than the thickness of the webs 16 to feed therethrough, thereby creating an added restraining frictional force.

While the invention has been described in connection with an ejection seat, it will be apparent that the principles thereof find utility in other areas, such as in a runway arresting barrier, in a vehicle braking system, in an elevator braking system, and so on.

After reading the foregoing detailed description, it will be apparent that the objects set forth at the outset of the specification have been successfully achieved by the present invention. However, since such detailed description was only directed to preferred embodiments of the present invention, it will be apparent that various changes may be made by those skilled in the art without departing from the spirit and scope of the invention as defined in the appended claims.

We claim:
1. A device for applying a stabilizing and restraining force to a first object as it moves away from a second object, said device comprising:
    at least two juxtaposed fabric webs and stitching means normally fastening said webs together;

said webs being at least partially slack when said first object is located near said second object;

a rigid element secured to one of said objects and projecting between said juxtaposed fabric webs;

said element being operative, as said first object moves away from said second object, to progressively contact against and break said stitching means, thereby progressively rending and separating said webs;

said breaking of said stitching means by contact and relative movement thereof against said element providing a restraining force which opposed movement of said first object away from said second object and also providing a stabilizing effect on said first object.

2. A device as defined in claim 1 wherein the quantity and pattern of said stitching means, and the strength of said stitching means can be preselected to thus preselect the amount of restraining force applied to said first object.

3. A device as defined in claim 1 wherein said stitching means are interrupted at selected portions along said web means to provide a portion where no stitches are broken for a selected interval of time, and during such interval of time, no restraining force will be applied to said first object.